Patented Jan. 6, 1948

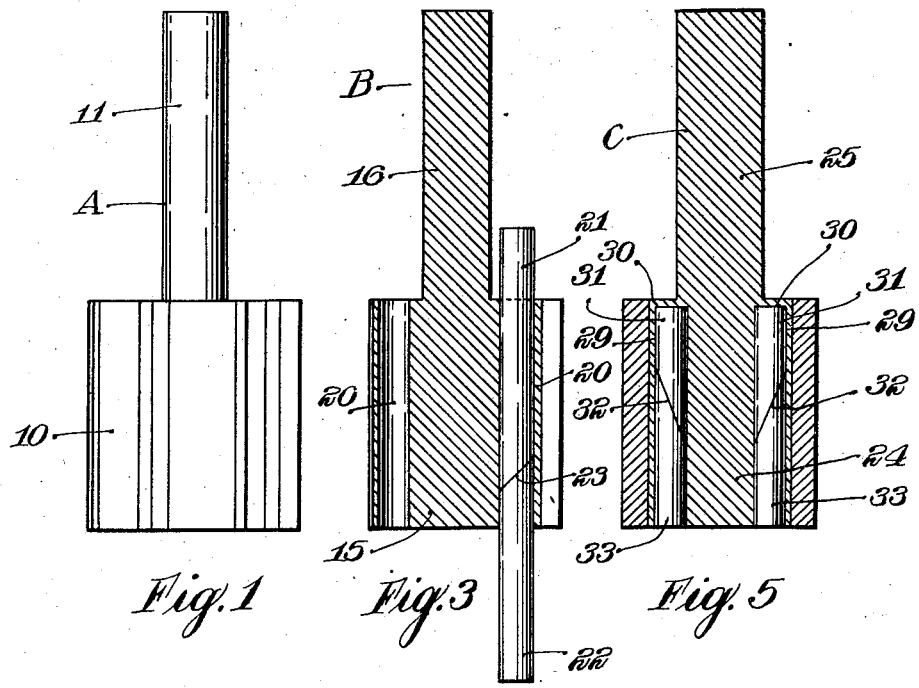
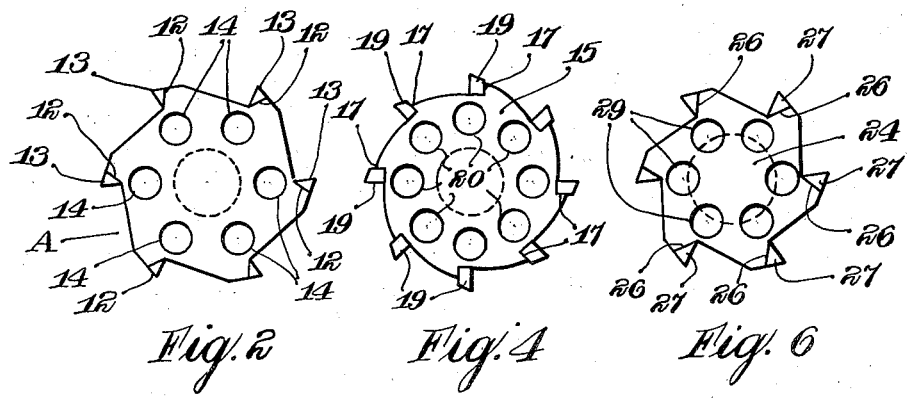

2,434,126

UNITED STATES PATENT OFFICE 2,434,126

EXPANSION REAMER

Henry R. Seifert, St. Paul, Minn.

Application April 5, 1944, Serial No. 529,568

5 Claims. (Cl. 77—75)

1

My invention relates to an improvement in expansion reamer, wherein it is desired to provide a reamer having cutting edges which may be restored to their original size after the reamer has been used to some extent.

In the use of a reamer, the cutting edges have been found to wear or compress inwardly during use so that the reamer soon becomes undersize and of improper diameter. In the past it has been common practice to discard reamers after they have been used but a short time, due to the necessity of maintaining the size of the opening within close tolerances. Various attempts have been made to provide reamers which may be expanded. These reamers have usually been provided with tapered apertures therein into which tapered plugs may engage. These tapered plugs expand the material of the reamer in an attempt to restore the reamer to its proper diameter. Such tapered means, however, have certain difficulties. In the first place the tapered openings through the reamer are not at an equal distance from the cutting edge throughout their length due to the tapered formation of the apertures. As a result expansion takes place more readily at one point than at the other and the metal has a tendency not to expand evenly.

A second difficulty with former expansion methods lies in the fact that at times the reamer becomes undersize only at one point in the length of the reamer and other parts of the reamer are substantially up to size. It is therefore desirable to provide an expansion means which will operate selectively at a desired point in the length of the reamer body.

The object of the present invention is to provide an expansion reamer which does not have certain of the previously experienced difficulties found with devices of this sort. With my reamer and method of expanding the same, one end of the reamer blades may be expanded a greater amount than the other end thereof and the expansion of the cutter blades at either end of the reamer is selective. As a result, if one end of the reamer is below size and the other end of the reamer is substantially of proper diameter, the reamer may be expanded at its small diameter end to be of constant diameter throughout the length of its blades.

A further feature of the present invention lies in the provision of a reamer having a core of relatively soft iron or the like, and having cutting surfaces of hardened material capable of withstanding high temperatures and extreme strain without dulling. As a result the relatively soft core of the reamer may be expanded so as to expand the hardened cutting edges supported thereby.

A feature of the present invention lies in the provision of a reamer having a series of cutting teeth and having apertures in the reamer body inwardly of these teeth or blades. Expansion means are placed in these apertures to expand the blades at the proper point.

A further feature of the present invention lies in the provision of an expansion reamer having apertures therethrough of equal diameter throughout their length. Expansion means are provided in these apertures so as to provide the necessary expansion. With such a structure the apertures through the body of the reamer may be easily and quickly drilled without the use of special tools or equipment.

A feature of the present invention lies in the means for expanding the body of the reamer. I provide a pair of wedge shaped blocks which extend into the openings and which may be wedged together in such a manner as to expand the body of the reamer and move the cutting edge of each blade outwardly to restore the proper diameter of the reamer.

These and other objects and novel features of my invention will be more clearly and fully set forth in the following specification and claims.

In the drawings forming a part of my specification:

Figure 1 is a side elevational view of my reamer.

Figure 2 is a bottom plan view of the same.

Figure 3 is a sectional view through one form of reamer.

Figure 4 is a bottom plan view of the reamer illustrated in Figure 3.

Figure 5 is a cross-sectional view through a modified form of construction of reamer.

Figure 6 is a bottom plan view of the reamer shown in Figure 5.

The reamer A, illustrated in Figures 1 and 2 of the drawings is disclosed as having a body portion 10 which has a concentric shank 11 projecting therefrom. The body 10 is shaped to provide a series of shoulders 12 in angularly spaced relationship, these shoulders extending inwardly from the circumference of the body. The body 10 is preferably formed of relatively soft iron which is sufficiently hard to hold its shape readily in the use of the reamer, but yet which is soft enough to permit expansion of the body without cracking the same.

Cutting blades 13 of high speed hard steel or the like are mounted upon the shoulders 12 in any suitable position so as to properly enlarge the size of the opening being reamed and so as to properly finish the surface being reamed. The manner in which the blades 13 are held upon the shoulders 12 is known in the art and is not new in the present invention.

Spaced inwardly in a radial direction from each of the teeth or blades 13 I provide an aperture 14 which extends through the body 10 from one end thereof to the other. These apertures 14 are of constant diameter throughout their length or substantially constant in diameter. The apertures 14 are positioned inwardly from the cutting edges so as to permit the reamer body to be expanded at this point when necessary so as to increase the diameter of the reamer.

In Figures 3 and 4 of the drawings I disclose a reamer construction B, very similar to that illustrated in Figures 1 and 2, with the exception of the shape of the cutting blades, and with the exception of the fact that eight of these blades are shown mounted upon the reamer body, rather than six. The reamer body 15 is provided with an integral projecting shank 16 which may be supported in any suitable supporting apparatus. A series of angularly spaced shoulders 17 are formed in angularly spaced relation upon the body 15, these shoulders extending inwardly from the outer circumference of the body. The shoulders 17 support cutting blades 19 mounted thereupon and secured thereto in any suitable manner. The blades 19 are preferably high speed steel, or a similar cutting material which will withstand considerable strain.

Apertures 20 are formed longitudinally through the body 15 in angularly spaced relationship and radially inwardly from the cutting blades 19. These apertures 20 extend through the relatively soft body 15 and permit the body to be expanded inwardly of the cutting blades so as to restore the cut edges to their original diameter. Thus after the reamer has been used for some time the cutting edges may be restored to their proper diameter.

In order to expand the reamer I provide a pair of bars 21 and 22, each of which is provided with a beveled edge 23 which is angularly inclined with reference to both the longitudinal axis of the tools and a plane arranged at right angles to this axis. These wedge bars or tools 21 and 22 may be forced together in such a manner that the wedge shape of the ends thereof spread the body 15 at the desired point. It will be noted that the tools 21 and 22 may be moved longitudinally within the apertures 14 or 20 so that the wedge shaped ends thereof are located at the proper position longitudinally of the body. Thus if only the lower ends of the blades are of reduced diameter after the reamer has been used, these lower ends may be restored to their proper diameter by placing the wedge-shaped ends inwardly of the lower ends of the cutting blades. Similarly if the cutting edges should wear at some other point in their length a corresponding part of the reamer body may be expanded so as to give the finished reamer the proper diameter.

In Figures 5 and 6 of the drawings I disclose a modified form of reamer C. In this form of construction the body 24 is formed of relatively soft iron, or the like, provided with an upwardly extending shank 25 thereupon. Angularly spaced shoulders 26 are provided on the reamer body extending inwardly from the outer circumference of the body. The shoulders 26 support cutter blades 27 which are secured thereto in any suitable way. The cutter blades 27 are preferably of high speed steel or the like, capable of withstanding considerable strain without dulling.

Apertures 29 are formed in the body 24 inwardly from the cutting blades 27. These apertures 29 do not extend entirely through the reamer body, but terminate at a point 30 below the upper extremity 31 of the reamer. Smaller diameter apertures may continue from the apertures 29 if it is so desired, but due to the fact that the tool body 24 is of relatively small diameter compared to the shank 25, the apertures 29 are not accessible longitudinally from the upper ends thereof.

Relatively short rods or bars 31, having relatively long wedge shaped ends 32 are inserted into the apertures with the wedge shaped ends thereof lowermost. Cooperating wedge shaped rods or bars 33 are provided in the lower ends of the apertures 29 and these bars or rods 33 are provided with wedge shaped ends which cooperate with the ends 32 of the bars 31. As the bars 33 are forced inwardly the body 24 is expanded in diameter so as to spread the cutter blades 27 apart to restore the proper diameter.

The tools or wedges 21 and 22 are preferably removable from the apertures 20 after the apertures have been expanded in diameter. Some difficulty would be involved in removing the wedges 31 and 33 so these expansion members may remain permanently in place if it is so desired.

In accordance with the patent statutes, I have described the principles of construction and operation of my expansion reamer, and while I have endeavored to set forth the best embodiments thereof, I desire to have it understood that obvious changes may be made within the scope of the following claims without departing from the spirit of my invention.

I claim:

1. An expansion reamer comprising a body having a concentric shank extending therefrom, a series of angularly spaced cutter blades thereon, a plurality of angularly spaced apertures in said body extending parallel to the axis of said shank and positioned inwardly of said cutter blades, said apertures being of substantially equal diameter throughout the length, and means engageable in said apertures for expanding said body said means comprising two members at least one of which is provided with a wedge shaped end movable into wedging engagement with each other.

2. An expansion reamer comprising a body having a shank projecting therefrom, a series of angularly spaced cutter blades thereon, a series of apertures in angularly spaced relation in said body and positioned inwardly of said cutter blades, said apertures being of substantially similar cross-section area throughout their length, and cooperable elements having their inner ends wedge-shaped and movable in said apertures into wedging engagement with each other to expand said body.

3. A reamer comprising a substantially cylindrical body having longitudinally extending cutting blades thereupon, apertures extending entirely through said body and positioned inwardly of said blades, and a pair of elements having wedge-shaped inner ends engageable in said apertures from opposite ends thereof, said wedge shaped ends being movable into wedging engagement with each other when inserted in said apertures to expand said body.

4. A reamer comprising a substantially cylindrical body, a coaxial shank projecting from one end of said body, a series of angularly spaced cutter blades on said body, a series of angularly spaced apertures through said body positioned inwardly of said blades and substantially parallel to the axis of said shank, and a pair of cooperable elements having wedge-shaped inner ends insertable into said apertures from opposite ends thereof, said wedge shaped ends being movable into wedging engagement with each other when driven together to expand said body.

5. A reamer comprising a body of substantially cylindrical form, a coaxial shank projecting from one end of said body, a series of angularly spaced cutting blades about the periphery of said body, a series of apertures in said body spaced inwardly from said blades, said apertures terminating at their inner extremity to form a shoulder, a series of elements in said apertures against said shoulders having wedge-shaped outer ends, and a series of relatively movable cooperable elements having wedge-shaped inner ends engageable with the outer ends of said first named wedge shaped elements to expand the body of the reamer.

HENRY R. SEIFERT.

REFERENCES CITED

The following references are of record in the file of this patent:

UNITED STATES PATENTS

| Number | Name | Date |
|---|---|---|
| 1,005,223 | Jaques, Jr. | Oct. 10, 1911 |
| 2,093,742 | Staples | Sept. 21, 1937 |
| 2,190,492 | Staples | Feb. 13, 1940 |